US010479262B2

(12) United States Patent
Troxler

(10) Patent No.: US 10,479,262 B2
(45) Date of Patent: Nov. 19, 2019

(54) SYSTEMS AND METHODS FOR REPLICATING VEHICULAR ILLUMINATION

(71) Applicant: Robert Ernest Troxler, Raleigh, NC (US)

(72) Inventor: Robert Ernest Troxler, Raleigh, NC (US)

(73) Assignee: International Research Institute iRI, Raleigh, NC (US)

( * ) Notice: Subject to any disclaimer, the term of this patent is extended or adjusted under 35 U.S.C. 154(b) by 0 days.

(21) Appl. No.: 14/214,510

(22) Filed: Mar. 14, 2014

(65) Prior Publication Data

US 2014/0265843 A1    Sep. 18, 2014

Related U.S. Application Data

(60) Provisional application No. 61/843,042, filed on Jul. 4, 2013, provisional application No. 61/785,737, filed on Mar. 14, 2013.

(51) Int. Cl.
*B60Q 1/00* (2006.01)
*B62J 6/00* (2006.01)
*B60Q 1/26* (2006.01)
*A42B 3/04* (2006.01)

(52) U.S. Cl.
CPC ......... *B60Q 1/0023* (2013.01); *B60Q 1/2673* (2013.01); *B60Q 1/2676* (2013.01); *B62J 6/00* (2013.01); *B62J 6/001* (2013.01); *A42B 3/0453* (2013.01); *B60Q 2900/30* (2013.01)

(58) Field of Classification Search
USPC ....................... 315/77–84; 340/479
See application file for complete search history.

(56) References Cited

U.S. PATENT DOCUMENTS

| 4,760,373 | A  | * | 7/1988  | Reilly    | A42B 3/0453  |
|           |    |   |         |           | 200/43.19    |
| 5,910,764 | A  | * | 6/1999  | Hayden    | 340/479      |
| 6,490,314 | B1 | * | 12/2002 | Khayrallah| H04B 1/707   |
|           |    |   |         |           | 375/131      |
| 7,218,214 | B2 |   | 10/2007 | Werner et al. |          |
| 7,455,139 | B2 | * | 11/2008 | Lee       | B60Q 1/2673  |
|           |    |   |         |           | 180/167      |
| 8,334,762 | B2 | * | 12/2012 | Szeljack  | A42B 3/0453  |
|           |    |   |         |           | 340/475      |
| 2003/0123705 | A1 | * | 7/2003  | Stam   | B60Q 1/085   |
|           |    |   |         |           | 382/104      |
| 2006/0197474 | A1 | * | 9/2006  | Olsen  | 315/312      |
| 2008/0122605 | A1 | * | 5/2008  | Tengler| B60Q 1/44    |
|           |    |   |         |           | 340/467      |

(Continued)

*Primary Examiner* — Jennifer Mehmood
*Assistant Examiner* — Jonathan G Cooper
(74) *Attorney, Agent, or Firm* — Olive Law Group, PLLC

(57) ABSTRACT

Systems and methods for replicating vehicular illumination are disclosed. According to an aspect, a system includes a detector configured to sense light emitted by a host light of a host vehicle for detecting a lighting state of the host light. The system also includes a communications system configured to communicate the detected lighting state between the host light and the remote light. Further, the system includes a remote light being located on one of the host vehicle and an operator of the host vehicle and configured to replicate the lighting state of the host light.

18 Claims, 4 Drawing Sheets

(56) References Cited

U.S. PATENT DOCUMENTS

| | | | |
|---|---|---|---|
| 2009/0302766 A1* | 12/2009 | Behr | B60Q 1/0023 |
| | | | 315/82 |
| 2010/0090820 A1* | 4/2010 | Oba | 340/447 |
| 2010/0294914 A1* | 11/2010 | Gianordoli | B60Q 11/005 |
| | | | 250/206 |
| 2011/0051400 A1* | 3/2011 | Cohen et al. | 362/106 |
| 2012/0007507 A1* | 1/2012 | Niemann | G01D 21/02 |
| | | | 315/82 |
| 2012/0212132 A1* | 8/2012 | Sakaguchi | 315/77 |
| 2012/0306641 A1* | 12/2012 | Howard et al. | 340/539.11 |

\* cited by examiner

SYSTEMS AND METHODS FOR REPLICATING VEHICULAR ILLUMINATION

CROSS REFERENCE TO RELATED APPLICATION

This application claims the benefit of U.S. Provisional Patent Application No. 61/785,737, filed Mar. 14, 2013 and titled APPARATUS FOR REPLICATING AUTOMOTIVE ILLUMINATION, and the benefit of U.S. Provisional Patent Application No. 61/843,042, filed Jul. 4, 2013 and titled APPARATUS FOR REPLICATING AUTOMOTIVE ILLUMINATION; the contents of which are hereby incorporated herein by reference in their entireties.

BACKGROUND

Technical Field

The present disclosure relates to vehicular illumination, and more specifically, to replicating vehicular illumination.

Description of Related Art

The lighting system of vehicles typically include "illumination" devices for assisting the driver to view his or her surroundings and "conspicuity" and "signaling" devices for helping other drivers see the vehicle. Typically, these devices include various types of lamps or lights. Automotive lights may be mounted or integrated on the front, side and/or rear of the automobile and may be implemented using, for example, incandescent bulbs, halogen lamps, xenon lights, neon tubes, or light emitting diodes (LEDs). The general purpose of vehicular lighting system is to provide illumination for the driver to operate the vehicle safely after dark, to increase the visibility of the vehicle, and to display information about the vehicle's presence, position, size, direction of travel, and driver's intentions regarding direction and speed of travel.

Tail lights (also referred to as "tail lamp," "rear position lamps," "tail lamp," and "rear light") provide night time vehicle conspicuity to other drivers at the rear of the vehicle. Tail lights are required to produce only red light, and to be wired such that they are lit whenever front position lamps or headlights are illuminated.

Turn signals (also, "directional indicators," "directional signals," "indicators," "directionals," "blinkers," or "flashers") are signal lights mounted near the left and right front and rear corners and are used to indicate to other drivers that the operator intends a lateral change of position (i.e., a turn or lane change).

Brake lights or "stop lamps" are red light steady-burning rear lamps which are brighter than tail lamps and activated when the driver applies the vehicle's brakes. Brake lights are required to be fitted in multiples of two, and symmetrically at the left and right edges of the rear of every vehicle. In North America, the range of acceptable intensity for a brake lamp containing one light source (e.g., bulb) is 80 to 300 candelas. In addition to having separate tail lights and brake lights, it is appreciated that tail lights may also be combined with a vehicle's brake lights to create a combined-function installation. In combined-function installations, rear facing lamps may produce brighter red light for the brake lamp function, and dimmer red light for the rear position lamp function. Regulations may specify minimum intensity ratios between the bright (brake) and dim (tail) lighting modes, so that a vehicle displaying rear position lamps will not be mistakenly interpreted as showing brake lamps, and vice versa.

Finally, a specialized brake light mounted higher than the vehicle's left and right brake lamps may be used in some vehicles in order to provide a deceleration warning and visual alarm to drivers whose view of normal brake lights is obstructed. This additional brake light may be referred to as a center high mount stop lamp (CHMSL) and may be a regulatory requirement in some jurisdictions. Because brake lights and turn signals are traditionally placed in the same housing, CHMSLs may help to disambiguate brake indicators from turn signals.

For motorcycles, conspicuity and signaling lights may be mounted on the sides of the rear fender, centered on the rear fender (i.e., above the license plate and below the driver's seat), and/or on the handlebars or front forks.

One problem associated with conventional motorcycle illumination systems is that a large portion of the rear-viewable area is unilluminated thus rendering motorcycle riders at a safety disadvantage compared to automobile drivers. For example, a motorcycle rider may wear a safety helmet and jacket or other clothing. Viewed from the rear, this surface area is typically unilluminated. Thus, in low-visibility situations, other drivers may be more likely to be involved in a rear end collision with motorcycles. Even in conventional systems which self-illuminate with reflective coatings, illuminate portions of a motorcycle rider's clothing, the illumination is often not coupled to the motorcycles tail lights, brake lights, and turn signals, thus reducing their overall effectiveness.

Accordingly, a need exists for improved methods and systems for replicating vehicular illumination.

BRIEF SUMMARY

Disclosed herein are systems and methods for replicating vehicular illumination. According to an aspect, a system includes a detector configured to sense light emitted by a host light of a host vehicle for detecting a lighting state of the host light. The system also includes a communications system configured to communicate the detected lighting state between the host light and the remote light. Further, the system includes a remote light being located on one of the host vehicle and an operator of the host vehicle and configured to replicate the lighting state of the host light.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

DETAILED DESCRIPTION

Figure 1:
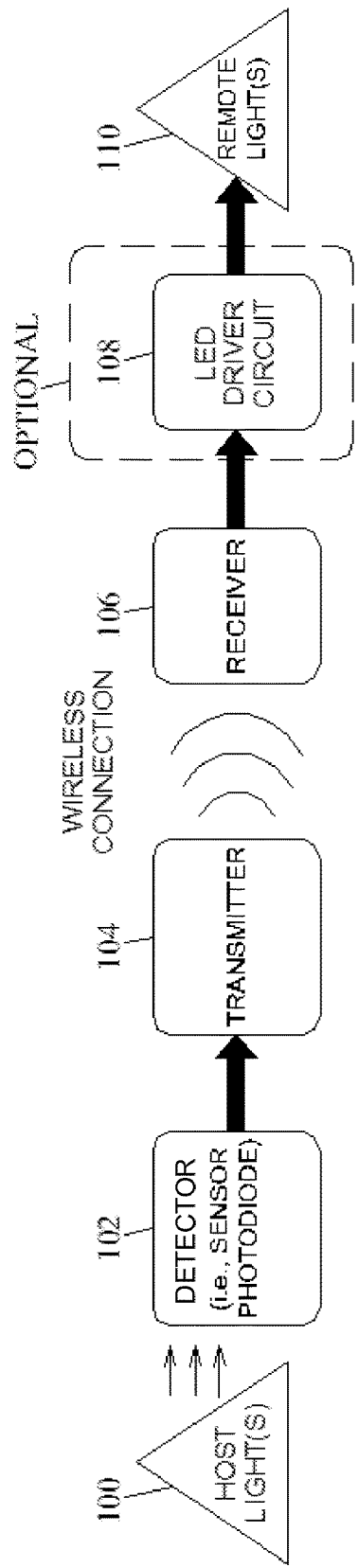
FIG. 1 is a system diagram of logical components for providing wireless motorcycle illumination according to an embodiment of the subject matter described herein.

FIG. 1 is a block diagram of logical components for replicating wireless vehicular illumination in accordance with embodiments of the present disclosure. Referring to FIG. 1, a lighting state of one or more host lights 100 may be replicated to a remotely located light 110 associated with a host vehicle. For example, an optical detector or sensor 102, such as a photodiode, may be attached to host lamp or light 100 for detecting whether host lamp is in an "on" or an "off" state corresponding to whether the lamp is illuminated, unilluminated, or somewhere in between, respectively. For example, the photodiode may detect whether light is emitting from the host light(s) 100. In addition to detecting a lighting state of host light(s) 100, the detector 102 may be configured to detect one of a color and an intensity (or brightness) of host light(s) 100. Information related to detected color, intensity, and/or the like may also be communicated such that these characteristics or lighting states of the host light(s) 100 may also be replicated as disclosed herein in accordance with embodiments of the present disclosure. In accordance with embodiments, one or more additional sensors can utilized for differentiating between ambient light and background light. The detection and transmission can have many states as in a digital detection methodology or be of a continuous signal as in an analog system.

The detector 102 may be operatively coupled to a wireless transmitter 104 for communicating the lighting state (e.g., on or off) to a wireless receiver 106. For example, the detector 102 and the transmitter 104 may be communicatively connected. The transmitter 104 may receive data or a signal waveform from the detector 102 that indicates an on state, off state, or intensity state of the host light(s) 100. Subsequent to receipt of the data, the transmitter 104 may communicate to the receiver 106 a signal indicative of the on state, off state, or intensity state. In one embodiment, wireless communications between transmitter 104 and receiver 106 may include components for BLUETOOTH™ communications technology for communication between each other. However, it is appreciated that other communications systems may also be used, including other wireless IEEE 802.11 systems or wired communications, without departing from the scope of the subject matter described herein.

Other types of detectors may also be used for determining the lighting state of the host light(s) 100. For example, an electrical sensor may be connected to a wiring harness associated with host light(s) 100. Alternatively, an accelerometer or strain gauge may be connected to the hand lever or foot brake for sensing use to detect when an associated host light is to be activated or de-activated. In response to detecting the intended activation or de-activation, the detector 102 can control the transmitter 104 to transmit a corresponding signal indicative of the activation (on state) or the de-activation (off state). Other example detectors include, but are not limited to, proximity sensors, magnetic field sensors, Hall effect sensors, infrared sensors, thermal sensors, visual wavelength based sensors, photosensors, cameras, voltage and current sensing devices, and the like.

Receiver 106 may optionally be associated with an LED driver circuit 108 configured to communicate the lighting state to one or more remote lights 110. The remote light(s) 110 may be an LED light. The remote light(s) 110 may be attached to the helmet and/or clothing of a motorcycle rider so as to provide increased rear directional warning and signaling to other drivers. In another example, the remote light(s) 110 may be attached to an automobile or trailer, and both right and left sides. It should be appreciated that in addition to LED lights, remote light 110 may utilize an incandescent light, Xenon light, strobe light, or compact fluorescent light (CFL) without departing from the scope of the subject matter described herein. The transmitter 104 and receiver 106 may collectively comprise a communications system configured to communicate a lighting state of the host light(s) 100 to remote the remote light(s) 110. In other embodiments, the communications system may include separate transceivers operatively associated with host light(s) 100 and the remote light(s) 110 for providing bidirectional communications. These communications may be used to acknowledge to the operator or electronic error codes whether the lamp is actually following the host light illumination process.

Regarding the physical placement of detector 102, running light and turn signal sensors may be mounted directly on the host vehicle's light assembly. Specifically, for example, the left turn and running light modules, along with transmitter 104 may be mounted on the left side of the vehicle and on top of their respective lights. An optical receiver may be mounted so as to receive optical radiation directly from the lamp. It may be mounted remotely from the lamp, but in visual contact with the light emission. Optical receiver/sensor may incorporate a lens. In another example, a detector may be placed inside the host light assembly in the lens or socket. Hence, it can be interior to or exterior to the host light assembly. Similarly, the right turn signal detector may be mounted on the right side of the host vehicle and connected to main transmit board 104 wirelessly or via a wire. In the example of motorcycles, the brake light detector may be mounted separately from the above mentioned detectors. In the example of other vehicles, the brake light detector may be located on top of the host vehicle's CHMSL. Conversely, accelerometers could be placed on the operator or host vehicle and communicate deceleration and turning maneuvers by BLUETOOTH® communication. One such convenient way to incorporate this technology is through use of the operators' cell phone. The accelerometer detecting an acceleration or deceleration is located directly on the cell phone and is communicated to the Bluetooth receiver of the remote lamp or CHMSL which decodes the Bluetooth signal and energizes the lamp depending on the intensity of the acceleration. In order to immediately obtain other drivers attention, the first action is to energize a bright strobe, whereby immediately this is followed by the illumination of the remote lamp to follow the accelerometer output. For trailers where not only brake indicators are of interest, there are the turn signals and nighttime states of interest. For automobiles with trailers, the detection of the signal lamps could not only be coupled by optical sensors on the lamps, but could be coupled mechanically to the turn signal selector and brake pedal. The sensors could be accelerometers, strain gauges, force indicators. The sensations or act of selecting the turn signal is relayed wirelessly to the remote trailer lamp. Trailer lamp may have multiple sets of LED's which are activated to sum together when both headlamps and braking is detected, and a separate set is selected to flashing when the turn signal is energized.

Thereafter, the lighting state may be replicated to remote lamp 110. For example, remote light 110 may be located, for example, on the helmet of a motorcycle rider, and may be operatively associated with host brake light 100 and illuminated when host brake light 100 is illuminated. Similarly, other remote lights 110 may be located in various locations and used to replicate the lighting states of one or more host lights 100 including, but not limited to, tail lights and turn signals.

Figure 2:
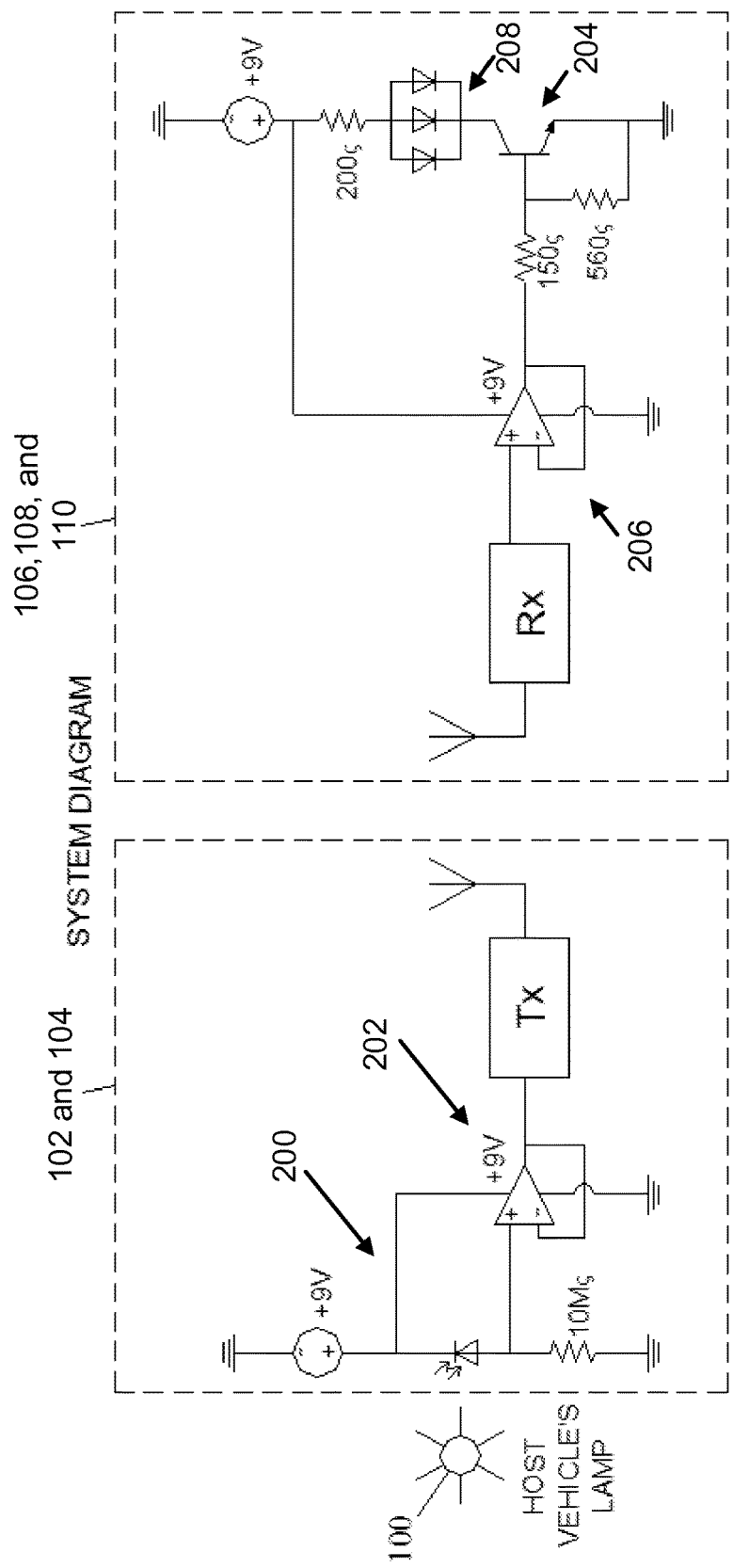
FIG. 2 is a schematic diagram of exemplary circuits for sending and receiving wireless communications for providing wireless motorcycle illumination according to an embodiment of the subject matter described herein.

FIG. 2 is a schematic diagram of exemplary circuits for sending and receiving wireless communications for providing wireless motorcycle illumination in accordance with embodiments of the present disclosure. Referring to FIG. 2, an optical sensor (generally designated 200) may be implemented with a photodiode and resistor pair. For example, the optical sensor may include a photodiode coupled with a 10 MΩ resistor 202. It should be appreciated that the photodiode may be specifically matched to be most responsive to wavelengths similar to that of red and yellow light.

According to one embodiment, the apparatus described herein may be based upon a one-way radio frequency (RF) communications system utilizing two separate narrow band RF links operating at 315 MHz, 433 MHz, or other FCC allowable bands such as 916.5 MHz respectively. Exemplary frequency bands and transmission protocols include low level BLUETOOTH® and the DSRC 5.85 GHz-5.925 GHz band, and WI-FI® like protocols for transmitting the warning signals. At the host vehicle, optical pickups (e.g., photodiodes) may be used to acquire the instantaneous state yet continuous state of the host vehicle's light system. The state of each host light may be encoded and sent as a binary 1's or 0's to the transmitter, where the information may be routed to either a 315 MHz multi-input (i.e., left turn signal, right turn signal, rear light) or a 433 MHz single-input (i.e., brake light) transmitter. Continuous analog signals may also be represented on the transmitter, and received by the receiver using a radio modulation scheme as simple as FM and AM radio techniques.

In the case of a 315 MHz multi-input transmitter, turn signal and rear light states may be encoded using a 10-bit address and relayed wirelessly to both the left and right trailer light pods. The information may then be received by a 315 MHz multi-output receiver and checked against a 10-bit decode address. If there is a match between the encoded and decoded addresses, the received bits may be sent to an appropriate output LED driver circuit. Otherwise, if the addresses do not match, the receiver may reject the data transmission, keeping its output data lines latched to the previous state. The addresses may be coded randomly at the factory, or by serial number of the light, by the owner's license number or plate number. This is to reduce the probability that a nearby vehicle is not controlling the host lights.

In the case of a 433 MHz single-input transmitter, there may be no encode/decode process. Rather, a 433 MHz single-output receiver 106 may be configured to replicate the current brake light state at its output pin, which may be routed to the LED driver circuit for display to remote light 110. Thus, it is appreciated that a circuit schematic for a 433 MHz single-input transmitter may be identical to a 315 MHz multi-input transmitter.

The detector 102 may detect a state (on/off/grey) of the host vehicle's running light, brake light, and turn signals via the photodiode and resistor pair shown in FIG. 2. For example, a reverse-biased photodiode may function as an optical detector by allowing a reverse saturation current proportional to the wavelength and intensity of incident light. Thus, when there is little incident light (i.e., from a particular light on the host vehicle), the photodiode may allow approximately 0 amps of reverse current, thus producing approximately 0 volts across the 10 MΩ resistor corresponding to a transistor-transistor logic (TTL) "low" state. Alternatively, when there is little incident light (i.e., the host vehicle's light activates), the photodiode may allow approximately 0.2 µA of reverse current, thus producing approximately 5V, or a TTL "high" across the 10 MΩ resistor. To complete the optical pickup, this voltage may be routed through a buffer integrated circuit (IC) (generally designated 202) and into the proper input pin of transmitter Tx. Optionally, buffer IC 2022 may be used to prevent any current draw by the transmitter and other attached circuitry. It is contemplated that many states may be encoded depending on the lamp intensity, or that typical analog techniques may be incorporated. For example, an ADC could code the light intensity level from 0-5V, and this could be sent via Bluetooth short range to the receiver which would DAC it and condition that voltage for output to remote lights 110.

In the embodiment shown in FIG. 2, it is appreciated that resistors may be selected to bias the bipolar junction transistor (BJT) (generally designated 204) in the active region while supplying ~100 mA of collector current. Additionally, a capacitor may be located between the input of a driver circuit (generally designated 206) and ground for preventing the BJT 204 from turning off during state transitions (thereby causing the LEDs 208 to flash unexpectedly) when the voltage from the buffer temporarily drops. The output data pins of a receiver Rx may directly control the driver circuit for LED grids 208. The receive Rx may be configured for receipt of signals from the transmitter Tx.

The transmitter Tx may utilize a surface acoustic wave (SAW)-based architecture to produce keyed output at one or more carrier frequencies. The receiver Rx may utilize matched 315 MHz multi-output and 433 MHz single-output SAW based receivers. For embodiments including a 315 MHz receiver, at any given time, the output data lines of the receiver may replicate the input data lines of transmitter Tx (for the last accepted data transmission). However, for embodiments including a 433 MHz receiver, because the receiver has no decode stage, its single output data line may simply replicate the input data line on transmitter Tx. In either embodiment, the output data lines may be fed through buffer IC to their respective driver circuits, which may use a common-emitter amplifier, in order to provide the necessary current for each remote light.

Figure 3:
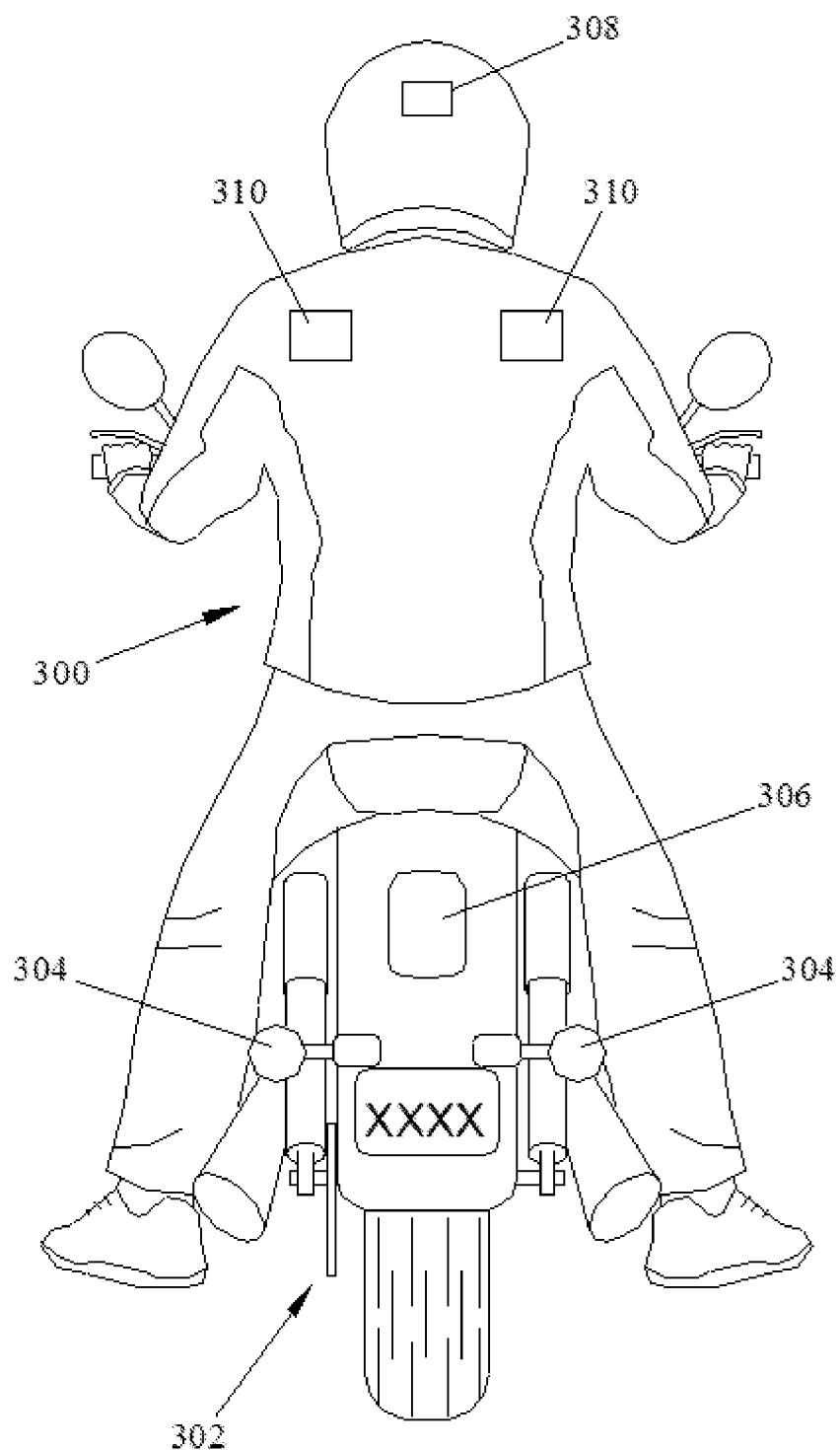
FIG. 3 is a diagram illustrating several possible locations of wireless brake and tail lights on a motorcycle driver's clothing and helmet for providing wireless motorcycle illumination according to an embodiment of the subject matter described herein.

FIG. 3 illustrates a rear perspective view showing locations of wireless brake and tail lights on a motorcycle driver's clothing and helmet for providing wireless motorcycle illumination in accordance with embodiments of the present disclosure. More particularly, the figure shows a motorcycle driver 300 on a motorcycle 302. The motorcycle driver 300 may be an operator of the motorcycle 302 and may wear protective clothing, such as a helmet and/or jacket. Host turn signal lights 304 may be located on the rear fender of motorcycle 302 on either side of the license plate. A host brake light 306 may be located above the license plate and centered on the rear fender.

As can be appreciated, when motorcycle driver 300 is seated in a driving position on motorcycle 302, only a small surface area of motorcycle 302 is visible to other motorists from behind. This limits the locations and size of safety lights for motorcycle 302. However, a large visible surface may be associated with the back of driver 300's helmet and torso. Accordingly, remote light 308 may be located on, or embedded within, the helmet of driver 300 for providing duplicate braking, signaling, or conspicuity illumination functions. Similarly, remote lights 310 may be located on various portions of the torso of driver 300, for example, for providing duplicate turn signaling functions.

As described above, remote lights 308 and 310 may receive lighting state information from host lights 304 and 306 associated with motorcycle 302 via a communications system in accordance with embodiments of the present disclosure. The communications system may include, but is not limited to, wireless communications (i.e., BLUETOOTH™) or wired communications technology.

Figure 4:
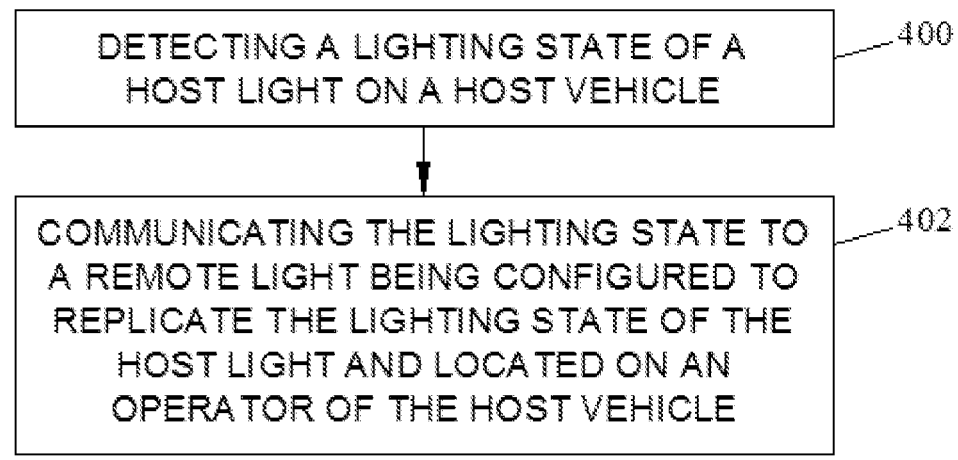
FIG. 4 is a flow chart showing exemplary steps for wirelessly replicating motorcycle illumination according to an embodiment of the subject matter described herein.

FIG. 4 is a flow chart of an example method for providing wireless motorcycle illumination in accordance with embodiments of the present disclosure. Referring to FIG. 4, in block 400, a lighting state or condition of intensity of a host light on a host vehicle is detected. For example, an optical detector or sensor, such as the detector 102 shown in FIG. 1, may be attached to the host light(s) 100 for detecting whether the host light(s) are in an "on" off or a "gray" state corresponding to whether the light is illuminated, unilluminated, or partially illuminated respectively. In addition to detecting a lighting state of the host light(s) 100, the detector 102 may be configured to detect one of a color and an intensity of host light(s) 100.

In block 402, the lighting state is communicated to a remote light being configured to replicate the lighting state of the host light and located on an operator of the host vehicle. For example, the detector 102 may be operatively coupled to the transmitter 104 for communicating the lighting state to the receiver 106. In embodiments, wireless communications between the transmitter 104 and the receiver 106 may be implemented by suitable BLUETOOTH™ communications technology or DSRC technology. In addition to detecting whether host light(s) 100 is on or off, or in between the detector 102 may be configured to detect one of a color and an intensity of host light(s) 100. Thereafter, the lighting state may be replicated to the remote light(s) 110. The minimum requirements from the Department of Transportation (DOT) are satisfied by incorporating regulatory standards of intensity, intensity ratios, colors and timing with respect to flashing and blinking lamps. Regulatory standards of wireless communication including V2V and V2I are met following rules from the FCC and ITS.

A power supply may be tapped into the electrical system of the host, be a solar cell, or battery. An optical sensor may be utilized as a component for the detector for detecting the state of the host tail lamps. But many types of sensors may alternatively be incorporated. The sensors may be an accelerometer attached to a blinker of a taillight. Other locations for physical or motion sensors may include, but are not limited to, a brake pedal for example.

The ability to reduce false triggers of a slave lamp is important. One problem is to filter the background light out of the sensing circuit. This can be done using 2 sensors, where one is not connected to the host lamp, but is positioned to sense the ambient light. The response of the ambient sensor is subtracted from the response of the lamp detector in real time to detect when the light is on. Some calibration may be necessary, as the ambient at the lamp may not be the same as that recorded at the ambient sensor. Other methods may include a single sensor solution where an optical filter is used to only allow light of a specific color to excite the sensor, or the sensor itself could be tuned to say RED only. The system may be programmed to calibrate itself for the ambient or background light.

Wireless transmission to remote lights is further receivable by secondary vehicles or other recipients for warning information simultaneously while illuminating remote lights. Exemplary frequency bands and transmission protocols include the DSRC 5.85 GHz-5.925 GHz band, and WiFi like protocols. The recipients can be Vehicle to Infrastructure V2I or Vehicle to Vehicle V2V. Warnings to remote drivers are manifested in visual safety light warnings directly on the host vehicle, and have the ability to process receipt of the information from the wireless transmission.

In still another embodiment, optical cameras could be used to detect the state of the indicator lamps on a vehicle. For example, a Pixelink camera could be placed on the trailer in tow with optics focused to read the state of the rear lights of the host. The camera could be placed on the trailer or the host. Systems such as these could analyze the pixel pattern, and through software program and a controller, decode the lamp state, and through a logic diagram, faithfully transmit the proper trailer light state to the proper lamps. The transfer of information could be wireless or through a wired system.

In the realm of electronics, these lights are not fast signals. Thus the slowly varying voltage values are wirelessly and continuously transmitted to the remote using an authenticated or coded communication channel. For analog channel embodiments, the communication is performed via frequency modulation or pulse width modulation or a combination thereof. The authentication can be performed via a predefined carrier time frequency profile. For digital channel embodiments, the communication channel is performed an authenticated digital low energy, short range protocol such as WIFI, ANT+, Bluetooth, Bluetooth Low Energy, Zigbee, DASH7 communication standards or other ad-hoc digital method. The pairing between the transmitter and the remote is established during an initialization phase in order to prevent communication of information to untrusted (units) and potential crosstalk between channels and other vehicles.

In addition, regulatory standards are met for the location, shape and size of the remote lights such as the position, shape and size of the light on a motorcycle helmet. Regulatory standards of wireless communication including V2V and V2I are met following rules from the FCC and ITS.

Many modifications and other embodiments of the present disclosure set forth herein will come to mind to one skilled in the art to which the present disclosed subject matter pertains having the benefit of the teachings presented in the foregoing descriptions and the associated drawings. Therefore, it is to be understood that the present subject matter is not to be limited to the specific embodiments disclosed and that modifications and other embodiments are intended to be included within the scope of the appended claims. Although specific terms are employed herein, they are used in a generic and descriptive sense only and not for purposes of limitation.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system comprising:
   a first detector configured to sense light emitted by a first light of a vehicle, wherein the first detector is configured and positioned to directly receive the first light emitted by the vehicle;
   a second detector being separate from the first detector and positioned to sense background light;
   at least one electrical component configured to compare the sensed background light and the sensed first light to determine a lighting state of the first light from among a plurality of different lighting states;

a communications system configured to wirelessly communicate the determined lighting state to a lighting system attached to one of a helmet and clothing of a motorcycle driver or a towed apparatus; and a remote light of the lighting system being configured to replicate the determined lighting state of the first light.

2. The system of claim 1, wherein each of the first detector and the second detector includes one of an optical sensor, a photodiode, an electrical sensor, an accelerometer, a strain gauge, an infrared (IR) detector, thermal sensor, a magnetic field sensor, an electric field sensor, a voltage detector, a current detector, and a camera.

3. The system of claim 1, wherein the first light includes one of an incandescent light, a compact fluorescent light (CFL), a Xenon light, and a light emitting diode (LED).

4. The system of claim 1, wherein the lighting state includes one of an on state, an off state, and a partially-on state.

5. The system of claim 1, wherein one of the second light and the communications system is powered by one of a battery, solar energy, kinetic energy, and the host vehicle.

6. The system of claim 1, wherein the communications system includes a wireless connection.

7. The system of claim 6, wherein the wireless connection is one of a unidirectional wireless connection and a bidirectional wireless connection.

8. The system of claim 6, wherein the wireless connection includes a BLUETOOTH connection.

9. The system of claim 6, wherein the wireless connection utilizes at least one wideband radio frequency (RF) link.

10. The system of claim 6, wherein the wireless connection utilizes a single narrowband radio frequency (RF) link.

11. The system of claim 6, wherein the wireless connection utilizes multiple narrowband radio frequency (RF) links.

12. The system of claim 11, wherein the multiple narrowband RF links include:

a first RF link operating at one of about 315 MHz and 5.85 GHz; and a second RF link operating at one of about 433 MHz and 5.925 GHz.

13. The system of claim 1, wherein the communications system includes a wired connection.

14. The system of claim 1, wherein the communications system includes a separate transmitter and receiver.

15. The system of claim 1, wherein the communications system includes a transceiver.

16. The system of claim 1, wherein the communications system is configured to hop between multiple frequencies.

17. The system of claim 1, wherein the communications system is configured to utilize a key-coded wireless signal.

18. The system of claim 1, wherein the first and second detectors are configured to determine and cancel ambient light signals in the sensed light.

\* \* \* \* \*